United States Patent
Mohapatra et al.

(10) Patent No.: US 12,014,029 B2
(45) Date of Patent: Jun. 18, 2024

(54) SMART NAVIGATION

(71) Applicant: INTUIT INC., Mountain View, CA (US)

(72) Inventors: Deepankar Mohapatra, Plano, TX (US); Ronnie Douglas Douthit, Trinidad, TX (US); Mithilesh Kumar Singh, Ontario (CA); Manish Omprakash Bhatia, Las Vegas, NV (US); Jessica Colleen Danby, Carrollton, TX (US); Somin Heo, Plano, TX (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/663,976

(22) Filed: May 18, 2022

(65) Prior Publication Data

US 2022/0382424 A1   Dec. 1, 2022

Related U.S. Application Data (60) Provisional application No. 63/193,139, filed on May 26, 2021.

(51) Int. Cl.
*G06F 3/0483* (2013.01)
*G06F 3/04842* (2022.01)
(Continued)

(52) U.S. Cl.
CPC ........ *G06F 3/0483* (2013.01); *G06F 3/04842* (2013.01); *G06N 3/044* (2023.01); *G06N 3/08* (2013.01)

(58) Field of Classification Search
CPC . G06F 3/0483; G06F 3/04842; G06N 3/0445; G06N 3/08
See application file for complete search history.

(56) References Cited

U.S. PATENT DOCUMENTS 6,567,797 B1 *  5/2003  Schuetze ............. G06F 16/5866
                                             707/999.005
6,661,431 B1 * 12/2003  Stuart .................... G06Q 30/02
                                             715/733
(Continued)

OTHER PUBLICATIONS

Su, Zhong & Yang, Qiang & Lu, Ye & Zhang, Hongjiang. WhatNext: A Prediction System for Web Requests Using N-gram Sequence Models. In: Proceedings of the First International Conference on Web Information Systems Engineering, Jun. 19-21, 2000. vol. 1. https://doi.org/10.1109/WISE.2000.882395. (Year: 2000).*

(Continued)

*Primary Examiner* — Jeremy L Stanley
(74) *Attorney, Agent, or Firm* — Patterson + Sheridan, LLP (57) ABSTRACT

Aspects of the present disclosure provide techniques for application navigation recommendations using machine learning. Embodiments include determining one or more pages accessed by a user within an application. Embodiments include providing one or more inputs to a machine learning model based on the one or more pages accessed by the user. Embodiments include receiving, from the machine learning model based on the one or more inputs, one or more predicted pages. Embodiments include displaying, in a user interface, one or more elements recommending the one or more predicted pages to the user. Embodiments include receiving a selection of a given element of the one or more elements. Embodiments include navigating within the user interface, based on the selection, to a given page of the one or more predicted pages that corresponds to the given element.

13 Claims, 6 Drawing Sheets

(51) Int. Cl.
*G06N 3/044* (2023.01)
*G06N 3/08* (2023.01)

(56) References Cited

U.S. PATENT DOCUMENTS

| | | | | |
|---|---|---|---|---|
| 6,728,752 | B1* | 4/2004 | Chen | G06F 16/34 707/E17.058 |
| 7,162,522 | B2* | 1/2007 | Adar | G06Q 30/02 709/224 |
| 7,809,904 | B1* | 10/2010 | Wilt | G06F 12/126 711/159 |
| 8,219,583 | B2* | 7/2012 | Moitra | G06Q 30/02 707/711 |
| 8,745,168 | B1* | 6/2014 | Singleton | G06F 16/951 709/219 |
| 9,691,096 | B1* | 6/2017 | Dai | G06Q 30/0631 |
| 9,881,255 | B1* | 1/2018 | Castellanos | G06F 16/9574 |
| 10,430,825 | B2* | 10/2019 | Chaudhuri | H04L 67/535 |
| 10,732,952 | B1* | 8/2020 | Yu | G06F 8/64 |
| 10,783,450 | B2* | 9/2020 | Vlassis | G06Q 30/0255 |
| 10,949,432 | B1* | 3/2021 | Grayson | G06F 16/9035 |
| 11,004,135 | B1* | 5/2021 | Sandler | G06Q 30/0631 |
| 11,100,387 | B2* | 8/2021 | Ravindran | G06Q 30/02 |
| 11,100,568 | B2* | 8/2021 | Myara | G06Q 30/0641 |
| 11,106,859 | B1* | 8/2021 | Li | G06F 40/114 |
| 11,138,286 | B2* | 10/2021 | Birch | G06F 40/134 |
| 11,138,518 | B1* | 10/2021 | Yu | G06F 9/44526 |
| 11,188,840 | B1* | 11/2021 | Rivera | G06N 20/00 |
| 11,301,533 | B1* | 4/2022 | Green | G06F 16/9536 |
| 11,354,378 | B2* | 6/2022 | Chawla | G06N 3/08 |
| 11,361,242 | B2* | 6/2022 | Green | G06N 3/08 |
| 11,392,664 | B1* | 7/2022 | Merritt | G06F 16/90332 |
| 11,402,977 | B1* | 8/2022 | Truong | G06F 3/0483 |
| 2003/0074368 | A1* | 4/2003 | Schuetze | G06F 16/5838 707/E17.022 |
| 2003/0074369 | A1* | 4/2003 | Schuetze | G06F 16/355 |
| 2003/0101024 | A1* | 5/2003 | Adar | G06Q 30/0269 707/E17.107 |
| 2003/0110181 | A1* | 6/2003 | Schuetze | G06F 16/358 |
| 2010/0199295 | A1* | 8/2010 | Katpelly | G06N 5/04 725/46 |
| 2011/0016121 | A1* | 1/2011 | Sambrani | G06Q 30/02 707/E17.109 |
| 2011/0106796 | A1* | 5/2011 | Svaic | G06F 16/954 707/E17.109 |
| 2011/0119628 | A1* | 5/2011 | Carter | G06Q 10/1093 715/811 |
| 2012/0005192 | A1* | 1/2012 | Bao | G06F 16/9558 707/E17.119 |
| 2013/0006764 | A1* | 1/2013 | Zhang | G06Q 30/02 705/14.52 |
| 2013/0124449 | A1* | 5/2013 | Pinckney | G06N 20/00 706/52 |
| 2013/0226837 | A1* | 8/2013 | Lymberopoulos | G06F 16/9574 706/12 |
| 2014/0279793 | A1* | 9/2014 | Wohlstadter | G06Q 30/0277 706/46 |
| 2015/0213361 | A1* | 7/2015 | Gamon | G06N 20/00 706/12 |
| 2015/0293649 | A1* | 10/2015 | Sukumar | H04H 60/04 715/716 |
| 2016/0321549 | A1* | 11/2016 | Kuvshynov | G06K 9/6282 |
| 2017/0161640 | A1* | 6/2017 | Shamir | G06N 20/00 |
| 2017/0244801 | A1* | 8/2017 | Brisebois | H04L 67/568 |
| 2018/0082191 | A1* | 3/2018 | Pearmain | G06F 16/3334 |
| 2018/0121036 | A1* | 5/2018 | Moore | H04L 67/01 |
| 2018/0157981 | A1* | 6/2018 | Albertson | G06Q 30/0282 |
| 2018/0341864 | A1* | 11/2018 | Evnine | G06N 20/00 |
| 2019/0139092 | A1* | 5/2019 | Nomula | G06Q 30/0255 |
| 2019/0163801 | A1* | 5/2019 | Lerer | G06Q 50/01 |
| 2019/0279080 | A1* | 9/2019 | Rollat | G06N 3/08 |
| 2019/0342419 | A1* | 11/2019 | Bromand | H04L 67/5681 |
| 2020/0007634 | A1* | 1/2020 | Xie | G06F 16/313 |
| 2020/0019636 | A1* | 1/2020 | Srinivasaraghavan | G06F 16/9535 |
| 2020/0045354 | A1* | 2/2020 | Gao | G06F 16/583 |
| 2020/0110783 | A1* | 4/2020 | Ushanov | G06N 20/00 |
| 2020/0159790 | A1* | 5/2020 | Barbosa | G06N 5/04 |
| 2020/0242450 | A1* | 7/2020 | Tang | G06N 3/04 |
| 2020/0258045 | A1* | 8/2020 | Knupfer | G06Q 10/1053 |
| 2020/0265472 | A1* | 8/2020 | Ali | G06Q 30/0631 |
| 2020/0342268 | A1* | 10/2020 | Chen | G06F 9/30036 |
| 2020/0363920 | A1* | 11/2020 | Ignatyev | G06F 9/451 |
| 2020/0380556 | A1* | 12/2020 | Ainscough | G06N 3/0445 |
| 2020/0394540 | A1* | 12/2020 | Ochiai | G06N 20/00 |
| 2021/0004682 | A1* | 1/2021 | Gong | G06N 3/08 |
| 2021/0027146 | A1* | 1/2021 | Xu | G06N 3/0445 |
| 2021/0034324 | A1* | 2/2021 | Funayama | G06F 3/167 |
| 2021/0049225 | A1* | 2/2021 | Chang | G06F 16/9536 |
| 2021/0049458 | A1* | 2/2021 | Chang | G06F 16/951 |
| 2021/0081467 | A1* | 3/2021 | Chawla | H04L 67/561 |
| 2021/0117814 | A1* | 4/2021 | Flinn | G06Q 50/01 |
| 2021/0142118 | A1* | 5/2021 | Lugt | G06N 20/00 |
| 2021/0160247 | A1* | 5/2021 | Gaddam | G06N 20/20 |
| 2021/0166104 | A1* | 6/2021 | Hassan | G06N 3/082 |
| 2021/0201154 | A1* | 7/2021 | Rozental | G06K 9/6271 |
| 2021/0231449 | A1* | 7/2021 | Hu | G06Q 30/0269 |
| 2021/0232274 | A1* | 7/2021 | Lee | G06F 3/04842 |
| 2021/0241353 | A1* | 8/2021 | Sridhar | G06Q 30/0631 |
| 2021/0279552 | A1* | 9/2021 | Qiu | G06V 10/82 |
| 2021/0326400 | A1* | 10/2021 | Qiu | G06F 16/9535 |
| 2021/0336952 | A1* | 10/2021 | Margolin | G06Q 20/40 |
| 2022/0067551 | A1* | 3/2022 | Wei | H04L 67/025 |
| 2022/0107852 | A1* | 4/2022 | Kulkarni | G06F 40/284 |
| 2022/0138826 | A1* | 5/2022 | Wang | G06F 16/9538 705/26.63 |
| 2022/0147870 | A1* | 5/2022 | Agarwal | H04N 21/25891 |
| 2022/0171760 | A1* | 6/2022 | Qiu | H04N 21/252 |
| 2022/0188661 | A1* | 6/2022 | Tappin | G06F 16/248 |
| 2022/0245213 | A1* | 8/2022 | Ling | H04L 67/535 |
| 2022/0269935 | A1* | 8/2022 | Arivazhagan | G06N 3/0445 |
| 2022/0269956 | A1* | 8/2022 | Daruna | G06N 20/00 |

OTHER PUBLICATIONS

Forsati, Rana & Mohammad, Reza Meybodi & Rahbar, Afsaneh. (2009). An efficient algorithm for web recommendation systems. In : 2009 IEEE/ACS International Conference on Computer Systems and Applications, Rabat, Morocco, 2009, pp. 579-586, doi: 10.1109/AICCSA.2009.5069385. (Year: 2009).*

* cited by examiner

SMART NAVIGATION

RELATED APPLICATIONS

This application claims the benefit of U.S. Provisional Application No. 63/193,139, entitled "SMART NAVIGATION," by the same inventors, filed 26 May 2021, the contents of which are incorporated herein in their entirety.

INTRODUCTION

Aspects of the present disclosure relate to techniques for smart navigation in software applications through page recommendations based on machine learning.

BACKGROUND

As software applications become a ubiquitous part of life, ensuring that users are able to efficiently navigate through application pages to perform tasks has become increasingly important. In many cases, applications are used to perform tasks that are critical to business and personal life, such as accounting and tax preparation applications. Applications may have hundreds or thousands of pages to which users may navigate, only a limited number of which may be relevant to a given user at a given time.

A user navigating through an application may have difficulty determining which pages to access in order to accomplish the user's particular objectives. Furthermore, even once a user determines which pages to access, locating and accessing the pages generally involves scrolling, searching, reading, and/or selecting various controls within a user interface, which may take a substantial amount of time. While some applications guide a user through particular navigation paths associated with particular tasks, these navigation paths tend to be overly rigid, and may include pages that are irrelevant to a particular user and/or exclude pages that a particular user may want to access. Thus, conventional techniques for application navigation may result in inefficient usage of computing resources and may render applications excessively difficult to use for their intended purposes. As such, there is a need in the art for improved techniques for facilitating application navigation.

BRIEF SUMMARY

Certain embodiments provide a method for application navigation recommendations using machine learning. The method generally includes: determining one or more pages accessed by a user within an application via a user interface; providing one or more inputs to a trained machine learning model based on the one or more pages accessed by the user; receiving, as an output from the trained machine learning model based on the one or more inputs, one or more predicted pages; displaying, in the user interface, within or adjacent to a currently displayed page of the one or more pages accessed by the user, one or more user interface elements recommending the one or more predicted pages to the user; receiving a selection of a given user interface element of the one or more user interface elements; and navigating within the user interface, based on the selection, to a given page of the one or more predicted pages that corresponds to the given user interface element.

Other embodiments provide a system comprising one or more processors and a non-transitory computer-readable medium comprising instructions that, when executed by the one or more processors, cause the system to perform a method for application navigation recommendations using machine learning. The method generally includes: determining one or more pages accessed by a user within an application via a user interface; providing one or more inputs to a trained machine learning model based on the one or more pages accessed by the user; receiving, as an output from the trained machine learning model based on the one or more inputs, one or more predicted pages; displaying, in the user interface, within or adjacent to a currently displayed page of the one or more pages accessed by the user, one or more user interface elements recommending the one or more predicted pages to the user; receiving a selection of a given user interface element of the one or more user interface elements; and navigating within the user interface, based on the selection, to a given page of the one or more predicted pages that corresponds to the given user interface element.

Other embodiments provide a method for training a machine learning model. The method generally includes: receiving application navigation data of a plurality of users, the application navigation data indicating pages accessed by the users within an application; generating a training data set based on the application navigation data, wherein each training data instance in the training data set comprises: features indicating a set number of pages accessed by a given user of the plurality of users; and a label indicating one or more additional pages accessed by the given user; and training a model, using the training data set, for predicting pages to recommend to a given user based on application navigation data of the given user.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums related to application page recommendations using machine learning.

An application generally includes a large number of pages to which users may navigate while using the application. Pages may be associated with particular tasks and/or particular subject matter, and are accessed by a user via a user interface in order to accomplish different objectives within the application. During a particular session (e.g., instance of running the application), a user may only need to access a relatively small subset of all of the pages of the application. Identifying and accessing this subset of pages may take a considerable amount of time in applications with large numbers of pages. Thus, techniques described herein involve using machine learning techniques to beneficially predict pages that are likely to be relevant to a given user and recommending these pages to the user via convenient user interface controls that, when selected, are configured to cause the recommended pages to be immediately launched within the user interface.

Embodiments of the present disclosure utilize machine learning techniques to predict pages that are likely to be relevant to a user based on a navigation history of the user, which may include the pages most recently accessed by the user within the application. In some embodiments, one or more machine learning models are trained for page prediction based on historical navigation data of a plurality of users. Training and usage of machine learning models for page prediction are described in more detail below with respect to FIGS. 1 and 2.

When a user navigates to a given page within the application, the pages accessed by the user up to and including the given page may be used to determine input features to provide to one or more trained machine learning models. The one or more machine learning models output indications of one or more predicted pages for the user based on the input features. The predicted pages are then recommended to the user, such as within or adjacent to the given page that the user is currently viewing within a user interface. As described in more detail below with respect to FIG. 3, the predicted pages may be recommended via one or more user interface controls that allow the user to immediately access the predicted pages, such as by selecting the one or more user interface controls, thereby avoiding the time and computing resources conventionally associated with identifying, locating, and accessing the pages within the application.

Accordingly, techniques described herein constitute a technical improvement with respect to conventional techniques for application navigation, such as those in which a user must manually identify, locate, and access relevant pages and those in which users are guided through fixed application paths that do not take into account the particular user's navigation history. By utilizing machine learning techniques to automatically predict relevant pages for a user based on the user's navigation history and by recommending predicted pages via user interface controls that allow the predicted pages to be immediately accessed, embodiments of the present disclosure save time and computing resources (e.g., processing, memory, and network resources associated with searching for, navigating to, and launching relevant pages), and allow the application to be used more effectively for its intended purposes.

Example Computing Environment

Figure 1:
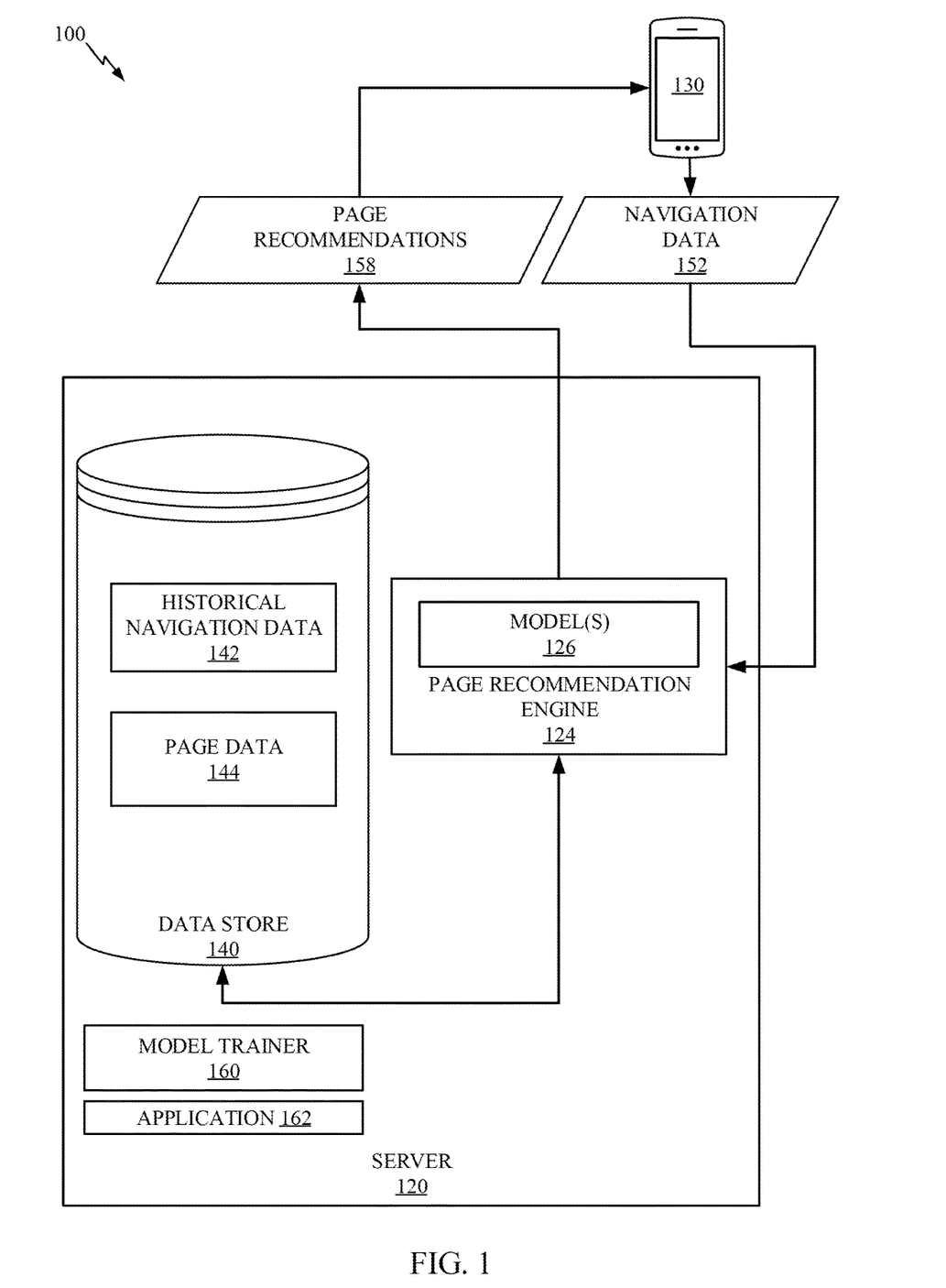
FIG. 1 depicts an example computing environment for application page recommendations using machine learning.

FIG. 1 illustrates an example computing environment 100 for application page recommendations using machine learning.

Computing environment 100 includes a server 120. In some embodiments, server 120 is connected to one or more networks over which data may be transmitted, such as a wide area network (WAN), local area network (LAN), cellular data network, and/or the like.

Server 120 generally represents a computing device such as a server computer. Server 120 includes an application 162, which generally represents a computing application that a user interacts with over network 610 via a client device, such as mobile device 130. In some embodiments, application 122 is accessed via a user interface associated with a client device. In one example, application 122 is a financial services application such as an accounting application.

Server 120 further includes a page recommendation engine 122, which determines pages to recommend to users of application 162. In some embodiments, page recommendation engine 124 is part of application 162. In another embodiment, application 162 and/or page recommendation engine 124 are located on mobile device 130. Page recommendation engine 124 utilizes one or more models 126 that have been trained using techniques described herein by a model trainer 160. In alternative embodiments, model trainer 160 is located on a separate system from server 120 (not shown).

Data store 140 generally represents a data storage entity such as a database or repository that stores historical navigation data 142 and page data 144. Historical navigation data 142 includes records of pages accessed by users within application 162, such as identifiers of pages associated with identifiers of users that historically accessed the pages. Page data 144 includes information about pages of application 162, such as identifiers of pages and content of pages.

Model(s) 126 may comprise one or more machine learning models that are trained based on, for example, historical navigation data 142. Training of model(s) 126 by model trainer 160 is described in more detail below with respect to FIG. 2. Once model(s) 126 are trained, they are used by page recommendation engine 124 to predict pages to recommend to users based on navigation data of the users, such as by providing input features to model(s) 126 based on pages accessed by users and receiving page predictions as outputs from model(s) 126.

In an embodiment, a user accesses application 162 from a mobile device 130. Mobile device 130 may, for example, be a mobile phone. In some embodiments, mobile device 130 may represent a computing device through which the user accesses pages of application 162, such as via a user interface displayed on mobile device 130. In alternative embodiments, application 162 may be resident on mobile device 130.

When the user navigates to a particular page of application 162, mobile device 130 provides navigation data 152 to page recommendation engine 124 indicating the pages that the user accessed prior to and including the particular page. Page recommendation engine 124 then uses model(s) 126 to determine one or more page recommendations 158 to provide to mobile device 130. In an embodiment, page recommendation engine 124 provides one or more inputs to model(s) 126 based on navigation data 152 and receives page predictions as outputs from model(s) 126 in response to the one or more inputs. The one or more inputs may include, for example, a vector representing all of the pages of application 162, where each value in the vector corresponds to a respective page and comprises a one (e.g., indicating that the user has accessed the page) or zero (e.g., indicating that the user has not accessed the page). The page predictions may indicate one or more pages (e.g., via identifiers of the pages) and, in some embodiments, one or more confidence scores indicating likelihoods that the one or more pages are relevant to the user.

As described in more detail below with respect to FIG. 2, model(s) may include a single model or a plurality of models. In one embodiment, a plurality of different types of machine learning models are used, and page recommendations 158 are determined based on outputs from the plurality of models, such as by selecting the predicted pages with the highest confidence scores output by the models. In another embodiment a single model is used and page recommendations 158 are determined based on one or more outputs from the single model, such as by recommending all pages predicted by the model or a subset of the predicted pages that have highest confidence scores.

Navigation data 152 may be stored in data store 140 as part of historical navigation data 142 for use by model trainer 160 in re-training model(s) 126. Furthermore, after page recommendations 158 are displayed to the user via mobile device 130 (e.g., as described in more detail below with respect to FIG. 3), user input with respect to page recommendations 158 (e.g., selecting one or more user interface controls to navigate to one or more recommended pages) may be used by model trainer 160 to re-train model(s) 126.

Example Model Training for Application Page Recommendations

Figure 2:
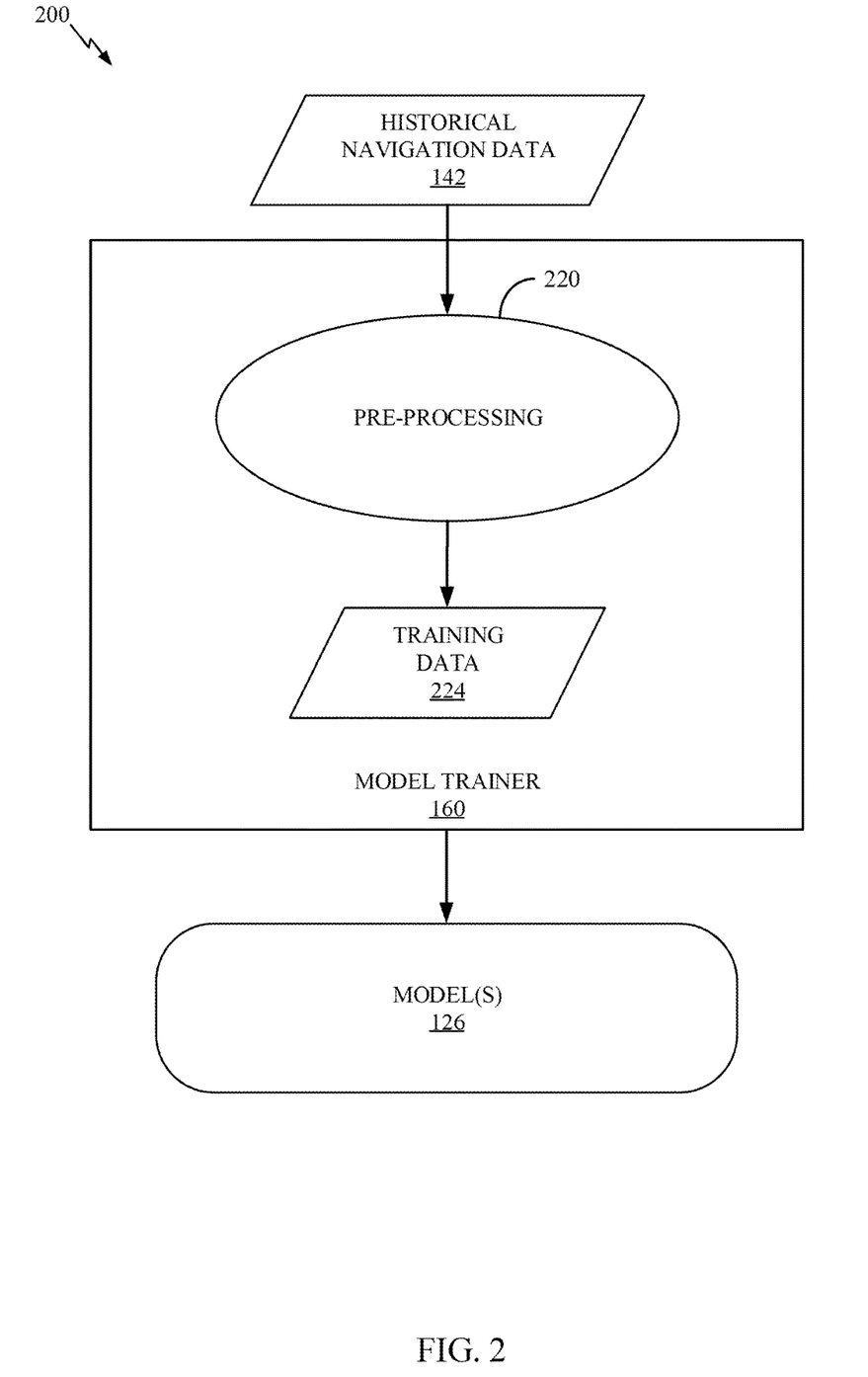
FIG. 2 depicts an example of training a model for application page recommendations.

FIG. 2 depicts an example embodiment 200 of training one or more machine learning models for application page recommendations.

In embodiment 200, model trainer 160 of FIG. 1 trains one or more models 126 of FIG. 1 using training data 224 based on historical navigation data 142 of FIG. 1.

Machine-learning models allow computing systems to improve and refine functionality without explicitly being programmed. Given a set of training data, a machine-learning model can generate and refine a function that determines a target attribute value based on one or more input features. For example, if a set of input features describes an automobile and the target value is the automobile's gas mileage, a machine-learning model can be trained to predict gas mileage based on the input features, such as the automobile's weight, tire size, number of cylinders, coefficient of drag, and engine displacement.

Historical navigation data 142 undergoes preprocessing 220 in order to generate training data 224. Historical navigation data 142 generally indicates pages historically accessed by each of a plurality of users. In some embodiments, pre-preprocessing 220 comprises generating vectors based on historical navigation data 142 and associating the vectors with labels. A given vector corresponding to a given user may include a plurality of values representing all pages of an application, and a given value in the vector may be 1 if the page was accessed by the user or 0 if the page was not accessed by the user (or if the page was accessed but is being used in the label). The label of the vector may be another vector indicating one or more additional pages accessed by the user.

In a simple example, an application has 10 total pages. Historical navigation data 142 indicates that a given user accessed pages 3, 5, 6, 8, and 10, and did not access pages 1, 2, 4, 7, and 9. In order to generate training data, the pages accessed by the given user are broken into groups including a first group for the input features and a second group for a label. For example, the first group may include pages 3, 5, and 6, and the second group may include pages 8 and 10. Thus, a training data instance in training data 224 may include input features indicating that pages 3, 5, and 6 were accessed (e.g., in the form of a vector such as {0, 0, 1, 0, 1, 1, 0, 0, 0, 0}) associated with a label indicating that pages 8 and 10 were also accessed (e.g., in the form of a vector such as {0, 0, 0, 0, 0, 0, 0, 1, 0, 1}). In this example, three accessed pages are used for input features, and the remaining two accessed pages are used for a label. Alternative embodiments may involve different distributions of accessed pages between input features and labels.

Similar training data instances may be generated for different combinations of the pages accessed by the given user, such as a training data instance comprising input features indicating that pages 5, 6, and 8 were accessed (e.g., in the form of a vector such as {0, 0, 0, 0, 1, 1, 0, 1, 0, 0}) associated with a label indicating that pages 3 and 10 were also accessed (e.g., in the form of a vector such as {0, 0, 1, 0, 0, 0, 0, 0, 0, 1}). In some embodiments, an input feature vector must include a minimum number of accessed pages, such as 3, and so every training data instance will include an input feature vector comprising at least the minimum number of accessed pages associated with a label indicating one or more additional pages accessed. In such cases, training data instances will only be generated from historical navigation records that include at least one more than the minimum number of accessed pages.

In other embodiments, the order in which pages were historically accessed is taken into account when generating training data 224. For example, rather than binary values, the vectors may include numbers indicating ordering of pages accessed (and zeroes for pages that were not accessed). For example, if a user accessed pages 2, 7, 4, 9, and 1 (in that order), then a training data instance may include input features indicating that pages 2, 7, and 4 were accessed sequentially (e.g., in the form of a vector such as {0, 1, 0, 3, 0, 0, 2, 0, 0, 0}) associated with a label indicating that pages 9 and 1 were subsequently accessed (e.g., in the form of a vector such as {2, 0, 0, 0, 0, 0, 0, 0, 1, 0}).

In additional embodiments, rather than binary values or ordering values being included in the vectors, the vectors are populated with amounts of data entered into pages by a given user. In an example, a user accessed page 2 and entered 231 kb of data, accessed page 3 and entered 10 kb of data, accessed page 7 and entered 500 kb of data, and accessed page 8 and entered 255 kb of data. A training data instance may include input features indicating the amounts of data entered into pages 2, 3, and 7 (e.g., in the form of a vector such as {0, 231, 10, 0, 500, 0, 0, 0, 0, 0}) associated with a label indicating the amount of data entered into page 8 (e.g., in the form of a vector such as {0, 0, 0, 0, 0, 0, 0, 255, 0, 0}) or a label simply indicating that page 8 was also accessed (e.g., in the form of a vector such as {0, 0, 0, 0, 0, 0, 0, 1, 0, 0}).

While certain embodiments involve vectors associated with accessed pages, other embodiments may include training data instances that indicate accessed pages in other ways, such as by identifiers of pages.

Furthermore, in some embodiments (e.g., those involving unsupervised learning techniques), training data 224 includes unlabeled training data instances, such as vectors indicating pages accessed by users (e.g., ordered, unordered, including amounts of data entered, or the like) without labels. For example, an unlabeled training data instance may be compared to a vector representing a given user's navigation data at runtime to determine whether the vectors are similar and, if so, to recommend pages to the given user based on the similarity of the vectors. For example, if the vectors have all but one value in common, the page corresponding to the one unmatching value may be recommended to the given user.

There are many different types of machine-learning models that can be used in embodiments of the present disclosure. For example, model(s) 126 may include one or more neural networks, classification models, support vector machines, Bayesian belief networks, regression models, deep belief networks, long short-term memory (LSTM) models, clustering models, or unsupervised models comprising vectors representing historical navigation data for comparison, among others.

In one example, a model 126 is a neural network. Neural networks generally include a plurality of connected units or nodes called artificial neurons. Each node generally has one or more inputs with associated weights, a net input function, and an activation function. Nodes are generally included in a plurality of connected layers, where nodes of one layer are connected to nodes of another layer, with various parameters governing the relationships between nodes and layers and the operation of the neural network.

In certain embodiments, the neural network comprises one or more LSTM layers. In a neural network, each node or neuron in an LSTM layer generally includes a cell, an input gate, an output gate and a forget gate. The cell generally stores or "remembers" values over certain time intervals, in some cases in both a backward direction (e.g., data input to the node) and a forward direction (e.g., data output by the node), while in other embodiments only in one direction, and the gates regulate the flow of data into and out of the cell. As such, an LSTM layer hones a representation by modifying vectors based on remembered data, thereby providing a more contextualized representation of an input sequence.

In some embodiments, the neural network is a classifier where each class corresponds to one or more pages (e.g., whether the one or more pages are relevant to the user). For example, the neural network may employ regression techniques to determine classifications of input vectors.

Model trainer 160 generally performs operations related to training model(s) 126. In some embodiments, training a given model 126 involves providing training inputs (e.g., indications of pages visited by users, such as in the form of vectors) to nodes of an input layer of the given model. The given model processes the training inputs through its various layers and outputs predicted pages. In particular embodiments, the predicted pages are output in the form of vectors where each value of the vector corresponds to a page of the application, each value including a binary value indicating whether or not a corresponding page is predicted or a confidence score (e.g., between 0 and 1) indicating a likelihood that the page is relevant. The predicted pages may alternatively be output in the form of page identifiers. The predicted pages are compared to the labels associated with the training inputs to determine the accuracy of the given model, and parameters of the given model are iteratively adjusted until one or more conditions are met. For example, the conditions may relate to whether the predictions produced by the given model based on the training inputs match the labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for each trained model, such as based on validation data and test data, as is known in the art.

In some embodiments, a model 126 may be an unsupervised model that contains vectors representing pages historically visited by users per historical navigation data 142. For example, at runtime, the model 126 may be used to compare a vector representing navigation data of a user with the vectors representing the pages historically visited by users, such as using cosine similarity. If the user's vector is determined to be similar to a vector in model 126, such as based on cosine similarity being below a threshold, then one or more pages may be recommended to the user based on the similarity. In one particular example, cosine similarities are determined between the user's vector and each of the vectors in the model 126, and pages that are most commonly included in vectors that are similar to the user's vector and that are not included in the user's vector are recommended to the user.

In some embodiments, training data 224 may also include additional features related to users corresponding to historical navigation data 142. Additional features may include, for example, user attributes such as geographic location, profession, marital status, length of use of the application, and the like. These features may also be associated with corresponding labels in training data 224, and may also be used to train model(s) 126. Subsequently, once a model 126 is trained, these additional features may also be gathered for a user for which page predictions are made, and may be provided as inputs to the model, such as in addition to inputs representing the user's navigation history.

In some embodiments, model(s) 126 comprise an ensemble of multiple models. Such an ensemble may be homogenous (i.e., using multiple member models of the same type, such as a random forest of decision trees) or non-homogenous (i.e., using multiple member models of different types). Individual machine learning models within such an ensemble may all be trained using the same subset of training data or may be trained using overlapping or non-overlapping subsets randomly selected from the training data. Outputs from the various member models of an ensemble may be used to determine a final output from the ensemble model using a variety of techniques, such as voting, comparing outputs to thresholds, selecting the outputs with the highest confidence scores, and/or the like.

Model(s) 126 may be re-trained (e.g., continuously or at regular intervals) based on updated navigation data and user feedback with respect to recommendations made using model(s) 126. For example, if a user selects one recommended page and does not select another recommended page, the user's selections may be used to create new training data instances (e.g., including the user's navigation data associated with a label indicating the recommended page that was selected by the user and not indicating the recommended page that was not selected by the user). The new training data instance may be used to re-train the model (e.g., using training techniques described above) for improved accuracy.

Figure 3:
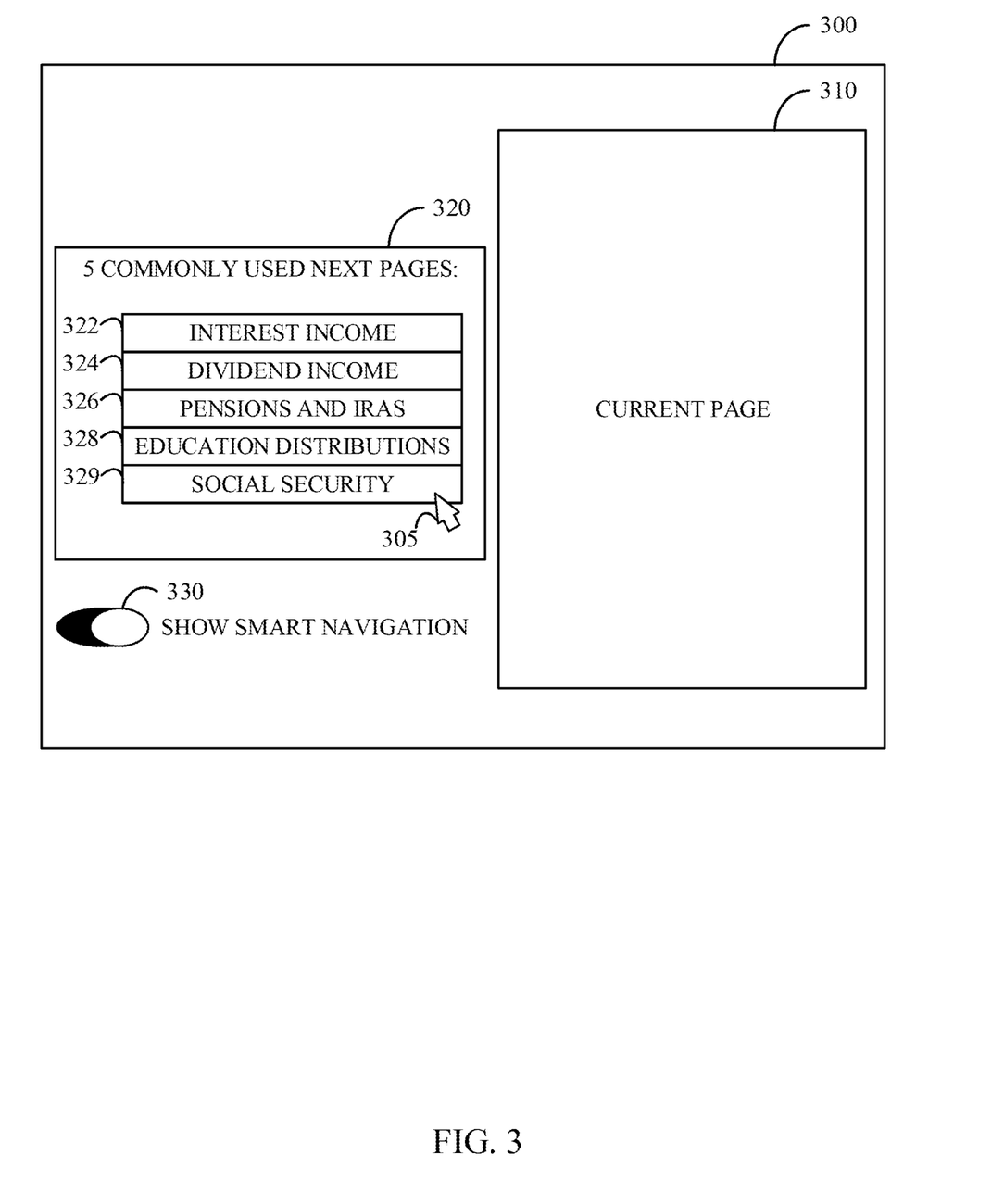
FIG. 3 depicts an example screen of a user interface related to application page recommendations using machine learning.

Example User Interface for Recommending Application Pages Using Machine Learning FIG. 3 depicts an example screen 300 of a user interface for recommending application pages using machine learning. For example, screen 300 may be displayed on mobile device 130 of FIG. 1, and may correspond to a user interface of application 162 of FIG. 1.

Screen 300 comprises a current page 310 that is being viewed. For instance, a user may have navigated to current page 310 after accessing one or more other pages within the application. The navigation data of the user representing the pages accessed by the user up to and including current page 310 is provided to page recommendation engine 124 of FIG. 1 for use in predicting pages to recommend to the user, as described above with respect to FIGS. 1 and 2. Page recommendations are provided via a panel 320 comprising user interface controls 322, 324, 326, 328, and 329.

Advantageously, user interface controls 322, 324, 326, 328, and 329, when selected (e.g., using cursor 305), are configured to cause recommended pages to be displayed within screen 300 without requiring the user to identify, locate, and navigate to the pages. For example, when user interface control 322 is selected, an "interest income" page is automatically loaded and displayed within screen 300, such as in place of current page 310. Similarly, when user interface control 324 is selected, a "dividend income" page is automatically loaded and displayed within screen 300. Similarly, when user interface control 326 is selected, a "pensions and IRAs" page is automatically loaded and displayed within screen 300. Similarly, when user interface control 328 is selected, an "educational distributions" page is automatically loaded and displayed within screen 300. Similarly, when user interface control 329 is selected, a "social security" page is automatically loaded and displayed within screen 300.

Thus, by recommending pages to a user via user interface controls 322, 324, 326, 328, and 329, techniques described herein not only save time and computing resources associated with determining relevant pages, but save additional time and computing resources associated with locating and accessing the relevant pages. Furthermore, by directing a user to access pages with a high likelihood of being relevant, screen 300 further avoids time and computing resources associated with accessing irrelevant pages that may have otherwise been accessed during the process of determining which pages are relevant and navigating to these pages.

In some embodiments, a fixed number of pages is recommended (e.g., five pages, as shown in panel 320), while in other embodiments any pages predicted to be relevant (e.g., all predicted pages with a confidence score over a threshold or with a binary indication of relevance) are recommended.

In certain embodiments, users are provided with the ability to enable or disable page recommendations. For example, screen 300 includes a control 330 (e.g., associated with the text "show smart navigation") by which the user can enable or disable page recommendations. When the user selects control 330 using cursor 305, page recommendations are enabled or disabled. For instance, a user may disable page recommendations after accessing recommended pages and completing one or more tasks.

It is noted that screen 300 is a non-limiting example, and other types of user interfaces and recommendation techniques may be utilized without departing from the scope of the present disclosure.

Figure 4:
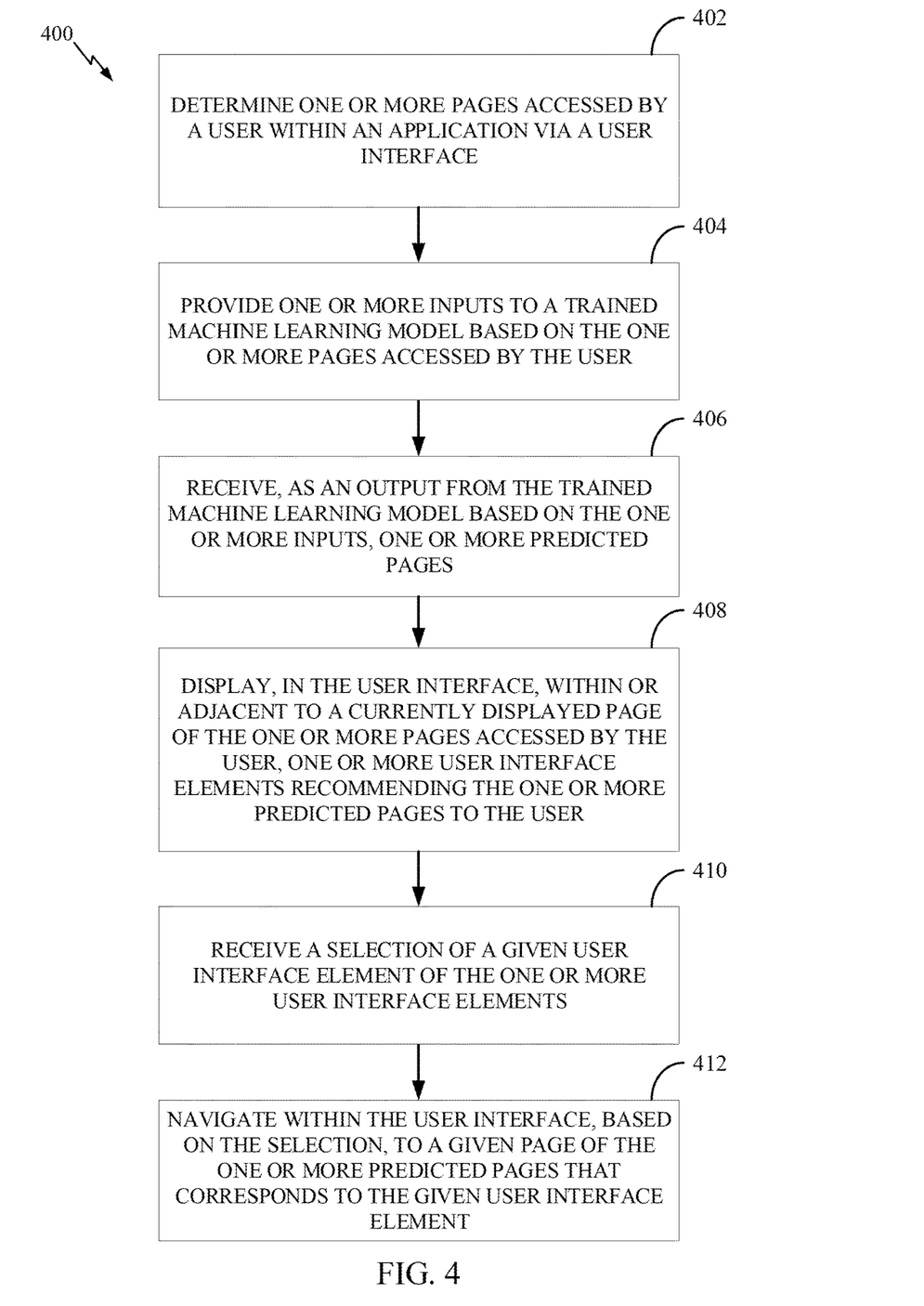
FIG. 4 depicts example operations for application page recommendations using machine learning.

Example Operations Related to Application Page Recommendations Using Machine Learning FIG. 4 depicts example operations 400 for application page recommendations using machine learning. For example, operations 400 may be performed by page recommendation engine 124 of FIG. 1.

Operations 400 begin at step 402 with determining one or more pages accessed by a user within an application via a user interface.

Operations 400 continue at step 404 with providing one or more inputs to a trained machine learning model based on the one or more pages accessed by the user. Providing the one or more inputs to the trained machine learning model based on the one or more pages accessed by the user may comprises generating a vector comprising a plurality of values indicating whether a plurality of pages in the application were accessed by the user, and inputting the vector to the trained machine learning model. The vector may further indicate an order of the one or more pages accessed by the user or amounts of data entered into the one or more pages accessed by the user.

In some embodiments, the trained machine learning model comprises one or more of a neural network comprising one or more long short-term memory (LSTM) layers, a classification model wherein each class of a plurality of classes corresponds to one or more application pages, or an unsupervised model comprising vector representations of historical navigation data.

Operations 400 continue at step 406 with receiving, as an output from the trained machine learning model based on the one or more inputs, one or more predicted pages.

The trained machine learning model may have been trained using supervised or unsupervised learning techniques. In one example, the output from the trained machine learning model may be based on a cosine similarity between a vector included in the one or more inputs and a vector in the trained machine learning model corresponding to historical navigation data of a given user other than the user.

Operations 400 continue at step 408 with displaying, in the user interface, within or adjacent to a currently displayed page of the one or more pages accessed by the user, one or more user interface controls recommending the one or more predicted pages to the user.

Operations 400 continue at step 410 with receiving a selection of a given user interface control of the one or more user interface controls.

Operations 400 continue at step 412 with navigating within the user interface, based on the selection, to a given page of the one or more predicted pages that corresponds to the given user interface control.

Some embodiments further involve providing, based on the selection, feedback to a model training component for re-training the trained machine learning model. Certain embodiments further comprise displaying, in the user interface, a control that, when selected, enables or disables page recommendations.

Example Operations for Training a Model for Application Page Recommendations

Figure 5:
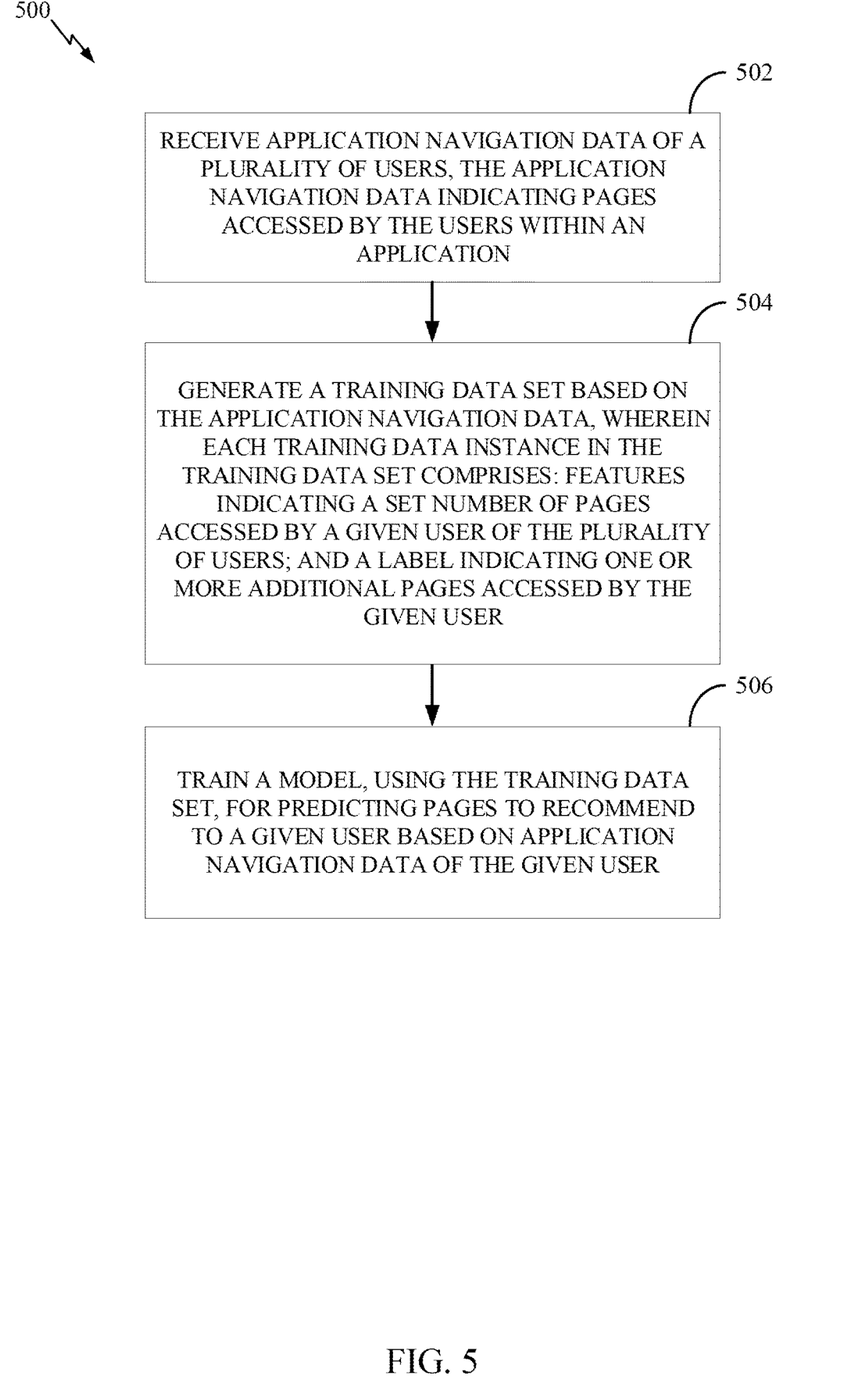
FIG. 5 depicts additional example operations related to application page recommendations using machine learning.

FIG. 5 depicts additional example operations 500 for training a model for application page recommendations. For example, operations 500 may be performed by model trainer 160 of FIGS. 1 and 2.

Operations 500 begin at step 502 with receiving application navigation data of a plurality of users, the application navigation data indicating pages accessed by the users within an application.

Operations 500 continue at step 504 with generating a training data set based on the application navigation data, wherein each training data instance in the training data set comprises: features indicating a set number of pages accessed by a given user of the plurality of users; and a label indicating one or more additional pages accessed by the given user. In one example, the set number of pages comprises three pages. In some embodiments, generating the training data set based on the application navigation data comprises, for each training data instance in the training data set, generating a feature vector, the feature vector comprising a first plurality of values indicating whether application pages are included in the one or more pages accessed by the given user, and generating a label vector, the label vector comprising a second plurality of values indicating whether the application pages are included in the one or more additional pages accessed by the given user.

The feature vector may further indicate an order of the one or more pages accessed by the given user or amounts of data entered into the one or more pages by the given user.

Operations 500 continue at step 506 with training a model, using the training data set, for predicting pages to recommend to a given user based on application navigation data of the given user.

In some embodiments, training the model comprises, for a given training data instance, inputting the features of the given training data instance to the model, receiving an output from the model based on the features, and iteratively adjusting parameters of the model based on comparing the output to the label of the given training data instance.

Certain embodiments further include receiving user input indicating an accuracy of one or more outputs from the model and re-training the model based on the user input.

Example Computing System

Figure 6:
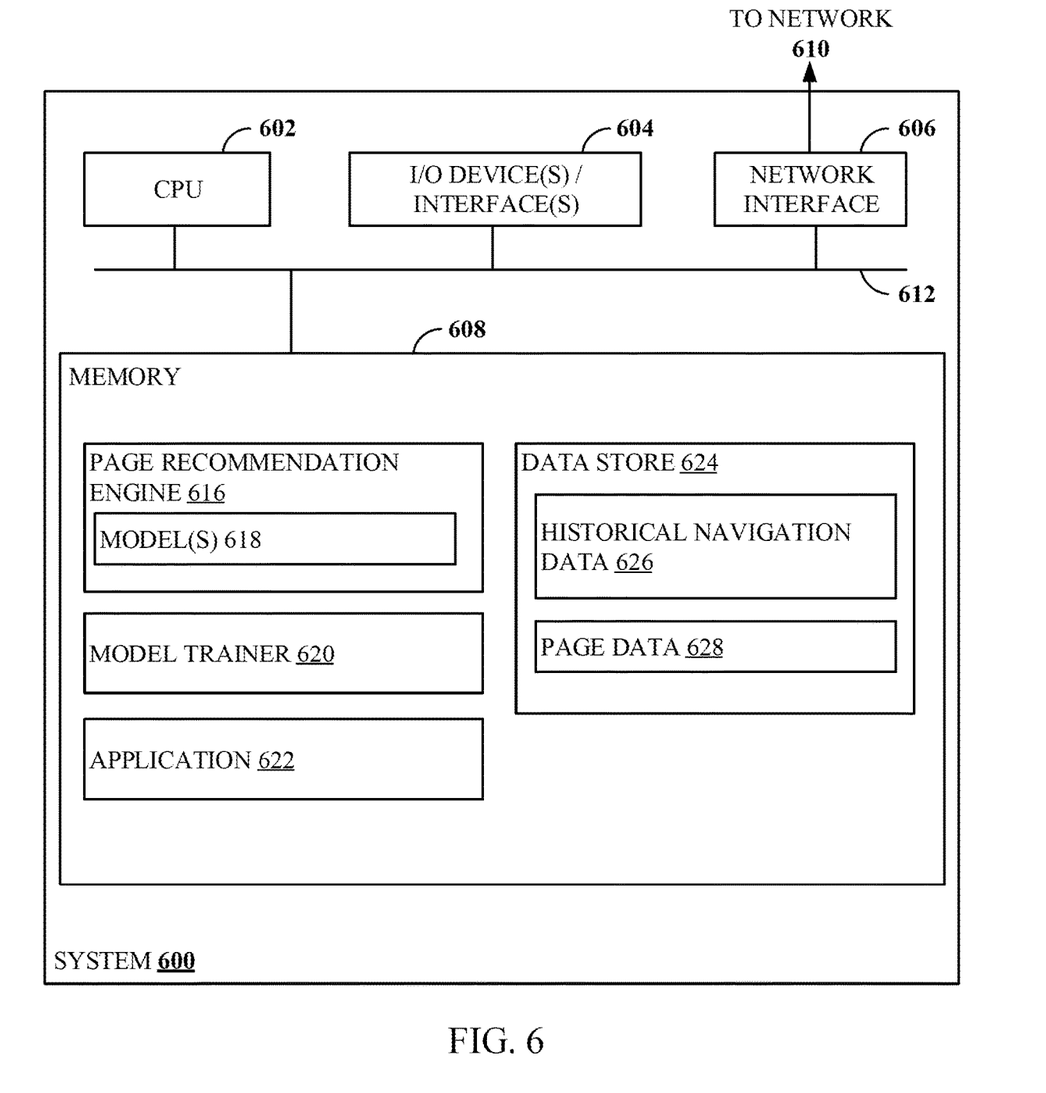
FIG. 6 depicts example an example processing system for application page recommendations using machine learning.

FIG. 6 illustrates an example system 600 with which embodiments of the present disclosure may be implemented. For example, system 600 may be representative of server 120 of FIG. 1.

System 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612. It is contemplated that one or more components of system 600 may be located remotely and accessed via a network 610. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements.

Additionally, the memory 608 is included to be representative of a random access memory or the like. In some embodiments, memory 608 may comprise a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, memory 608 includes page recommendation ending 616 comprising one or more models 618, model trainer 620, and application 622, which may be representative of page recommendation engine 124, model(s) 126, model trainer 160, and application 162 of FIG. 1.

Memory 608 further comprises data store 624 including historical navigation data 626 and page data 628, which may be representative of data store 140, historical navigation data 142, and page data 144 of FIG. 1.

Example Clauses

Clause 1: A method for application navigation recommendations using machine learning, comprising: determining one or more pages accessed by a user within an application via a user interface; providing one or more inputs to a trained machine learning model based on the one or more pages accessed by the user; receiving, as an output from the trained machine learning model based on the one or more inputs, one or more predicted pages; displaying, in the user interface, within or adjacent to a currently displayed page of the one or more pages accessed by the user, one or more user interface elements recommending the one or more predicted pages to the user; receiving a selection of a given user interface element of the one or more user interface elements; and navigating within the user interface, based on the selection, to a given page of the one or more predicted pages that corresponds to the given user interface element.

Clause 2: The method of Clause 1, further comprising providing, based on the selection, feedback to a model training component for re-training the trained machine learning model.

Clause 3: The method of any one of Clause 1-2, wherein providing the one or more inputs to the trained machine learning model based on the one or more pages accessed by the user comprises: generating a vector comprising a plurality of values indicating whether a plurality of pages in the application were accessed by the user; and inputting the vector to the trained machine learning model.

Clause 4: The method of claim 3, wherein the vector further indicates an order of the one or more pages accessed by the user.

Clause 5: The method of Clause 3, wherein the vector further indicates amounts of data entered into the one or more pages accessed by the user.

Clause 6: The method of any one of Clause 1-5, further comprising displaying, in the user interface, a control that, when selected, enables or disables page recommendations.

Clause 7: The method of any one of Clause 1-6, wherein the trained machine learning model comprises one or more of: a neural network comprising one or more long short-term memory (LSTM) layers; a classification model wherein each class of a plurality of classes corresponds to one or more application pages; or an unsupervised model comprising vector representations of historical navigation data.

Clause 8: The method of any one of Clause 1-7, wherein the output from the trained machine learning model is based on a cosine similarity between a vector included in the one or more inputs and a vector in the trained machine learning model corresponding to historical navigation data of a given user other than the user.

Clause 9: A method for training a machine learning model, comprising: receiving application navigation data of a plurality of users, the application navigation data indicating pages accessed by the users within an application; generating a training data set based on the application navigation data, wherein each training data instance in the training data set comprises: features indicating a set number of pages accessed by a given user of the plurality of users; and a label indicating one or more additional pages accessed by the given user; and training a model, using the training data set, for predicting pages to recommend to a given user based on application navigation data of the given user.

Clause 10: The method of Clause 9, wherein generating the training data set based on the application navigation data comprises, for each training data instance in the training data set: generating a feature vector, the feature vector comprising a first plurality of values indicating whether application pages are included in the one or more pages accessed by the given user; and generating a label vector, the label vector comprising a second plurality of values indicating whether the application pages are included in the one or more additional pages accessed by the given user.

Clause 11: The method of Clause 10, wherein the feature vector further indicates an order of the one or more pages accessed by the given user.

Clause 12: The method of any one of Clause 10-11, wherein the feature vector further indicates amounts of data entered into the one or more pages by the given user.

Clause 13: The method of any one of Clause 9-12, wherein training the model comprises, for a given training data instance: inputting the features of the given training data instance to the model; receiving an output from the model based on the features; and iteratively adjusting parameters of the model based on comparing the output to the label of the given training data instance.

Clause 13: The method of any one of Clause 9-13, further comprising: receiving user input indicating an accuracy of one or more outputs from the model; and re-training the model based on the user input.

Clause 14: A processing system, comprising: a memory comprising computer-executable instructions; and one or more processors configured to execute the computer-executable instructions and cause the processing system to perform a method in accordance with any one of Clause 1-14.

Clause 15: A processing system, comprising means for performing a method in accordance with any one of Clause 1-14.

Clause 16: A non-transitory computer-readable medium comprising computer-executable instructions that, when executed by one or more processors of a processing system, cause the processing system to perform a method in accordance with any one of Clause 1-14.

Clause 17: A computer program product embodied on a computer-readable storage medium comprising code for performing a method in accordance with any one of Clause 1-14.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for application navigation recommendations using machine learning, comprising:
    determining one or more pages accessed by a user within an application via a user interface;
    generating an input vector comprising one or more numerical values quantifying an amount of data the user entered into the one or more pages;
    providing the input vector to a trained machine learning model based on the one or more pages accessed by the user, wherein the trained machine learning model was trained using a training data set comprising two or more training data instances that relate to a single set of pages accessed by a respective user, wherein each of the two or more training data instances comprises a vector having a same number of elements, and wherein a given page of the single set of pages is indicated in a label of a first training data instance of the two or more training data instances and indicated in input features of a second training data instance of the two or more training data instances;
    receiving, as an output from the trained machine learning model based on the input vector, one or more predicted pages, wherein the one or more predicted pages are within the application and different from the one or more pages accessed by the user;
    displaying, in the user interface, within or adjacent to a currently displayed page of the one or more pages accessed by the user, one or more user interface elements recommending the one or more predicted pages to the user;
    receiving a selection of a given user interface element of the one or more user interface elements; and navigating within the user interface, based on the selection, to a given page of the one or more predicted pages that corresponds to the given user interface element.

2. The method of claim 1, further comprising providing, based on the selection, feedback to a model training component for re-training the trained machine learning model.

3. The method of claim 1, further comprising displaying, in the user interface, a control that, when selected, enables or disables page recommendations.

4. The method of claim 1, wherein the trained machine learning model comprises one or more of:
a neural network comprising one or more long short-term memory (LSTM) layers;
a classification model wherein each class of a plurality of classes corresponds to one or more application pages; or
an unsupervised model comprising vector representations of historical navigation data.

5. The method of claim 1, wherein the output from the trained machine learning model is based on a cosine similarity between the input vector and a vector in the trained machine learning model corresponding to historical navigation data of a given user other than the user.

6. The method of claim 1, wherein the input vector further comprises one or more zero numerical values for one or more pages within the application that were not accessed by the user.

7. A method for training a machine learning model, comprising:
receiving application navigation data of a plurality of users, the application navigation data indicating pages accessed by the users within an application;
generating a training data set based on the application navigation data, wherein:
each training data instance in the training data set comprises:
a feature vector comprising one or more numerical values quantifying an amount of data a given user of the plurality of users entered into one or more pages included in a set number of pages the given user accessed within the application; and
a label vector comprising one or more additional numerical values quantifying an amount of data the given user entered into one or more additional pages within the application, wherein the one or more additional pages are different from the set number of pages accessed by the given user;
the training data set comprises two or more training data instances that relate to a single set of pages accessed by a respective user of the plurality of users, wherein each of the two or more training data instances comprises a vector having a same number of elements; and
a given page of the single set of pages is indicated in the label vector of a first training data instance of the two or more training data instances and indicated in the feature vector of a second training data instance of the two or more training data instances; and
training a model, using the training data set, for predicting pages to recommend to a given user based on application navigation data of the given user.

8. The method of claim 7, wherein training the model comprises, for a given training data instance:
inputting the feature vector of the given training data instance to the model;
receiving an output from the model based on the features; and
iteratively adjusting parameters of the model based on comparing the output to the label vector of the given training data instance.

9. The method of claim 7, further comprising:
receiving user input indicating an accuracy of one or more outputs from the model; and
re-training the model based on the user input.

10. A system, comprising:
one or more processors; and
a memory comprising instructions that, when executed by the one or more processors, cause the system to:
determine one or more pages accessed by a user within an application via a user interface;
generate an input vector comprising one or more numerical values quantifying an amount of data the user entered into the one or more pages;
provide the input vector to a trained machine learning model based on the one or more pages accessed by the user, wherein the trained machine learning model was trained using a training data set comprising two or more training data instances that relate to a single set of pages accessed by a respective user, wherein each of the two or more training data instances comprises a vector having a same number of elements, and wherein a given page of the single set of pages is indicated in a label of a first training data instance of the two or more training data instances and indicated in input features of a second training data instance of the two or more training data instances;
receive, as an output from the trained machine learning model based on the input vector, one or more predicted pages, wherein the one or more predicted pages are within the application and different from the one or more pages accessed by the user;
display, in the user interface, within or adjacent to a currently displayed page of the one or more pages accessed by the user, one or more user interface elements recommending the one or more predicted pages to the user;
receive a selection of a given user interface element of the one or more user interface elements; and
navigate within the user interface, based on the selection, to a given page of the one or more predicted pages that corresponds to the given user interface element.

11. The system of claim 10, wherein the instructions, when executed by the one or more processors, further cause the system to provide, based on the selection, feedback to a model training component for re-training the trained machine learning model.

12. The system of claim 10, wherein the instructions, when executed by the one or more processors, further cause the system to display, in the user interface, a control that, when selected, enables or disables page recommendations.

13. The system of claim 10, wherein the input vector further comprises one or more zero numerical values for one or more pages within the application that were not accessed by the user.

* * * * *